US009532285B2

(12) United States Patent
Tang et al.

(10) Patent No.: US 9,532,285 B2
(45) Date of Patent: Dec. 27, 2016

(54) HANDING OFF A TERMINAL AMONG WIRELESS ACCESS POINTS

(71) Applicant: International Business Machines Corporation, Armonk, NY (US)

(72) Inventors: Jianbin Tang, Doncaster East (AU); Feng J. Wang, Beijing (CN); Yu Wang, Beijing (CN); Jun Chi Yan, Shanghai (CN); Chao E. Zhang, Beijing (CN); Qian Kun Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/524,453

(22) Filed: Oct. 27, 2014

(65) Prior Publication Data
US 2015/0117414 A1 Apr. 30, 2015

(30) Foreign Application Priority Data
Oct. 30, 2013 (CN) .......................... 2013 1 0524940

(51) Int. Cl.
*H04W 36/08* (2009.01)
*H04W 36/30* (2009.01)
*H04W 40/36* (2009.01)
*H04W 84/12* (2009.01)

(52) U.S. Cl.
CPC ............. *H04W 36/08* (2013.01); *H04W 36/30* (2013.01); *H04W 84/12* (2013.01); *Y02B 60/50* (2013.01)

(58) Field of Classification Search
CPC .................................................... H04W 39/08
USPC ........................................ 370/338, 331, 332
See application file for complete search history.

(56) References Cited

U.S. PATENT DOCUMENTS

| 7,072,323 | B2 | 7/2006 | Roberts et al. |
| 7,453,858 | B2 | 11/2008 | Csapo et al. |
| 7,986,915 | B1* | 7/2011 | Wang ..................... H04B 7/155 455/7 |
| 2004/0043767 | A1* | 3/2004 | Tsutsumi .............. H04W 36/08 455/432.1 |
| 2005/0271021 | A1* | 12/2005 | Alemany .............. H04W 48/20 370/338 |

(Continued)

OTHER PUBLICATIONS

Ramachandran et al., "Make-Before-Break MAC Layer Handoff in 802.11 Wireless Networks", 1-4244-0355-3/06, Copyright 2006 IEEE, pp. 4818-4823.

(Continued)

*Primary Examiner* — Curtis A Alia
*Assistant Examiner* — Emmanuel Maglo
(74) *Attorney, Agent, or Firm* — Pooya Shoghi Ghalehshahi; Issac J. Gooshaw; Steven L. Fisher-Stawinski

(57) ABSTRACT

A method and system for handing off a terminal among a plurality of wireless access points (APs) connected to a central management AP. The method comprising: receiving network condition information of a terminal communicatively connected to a first wireless AP among the plurality of wireless APs. Determining a second wireless AP the plurality of wireless APs to which the terminal is to be handed off based on the network condition information of the terminal. The second wireless AP is virtually connected to the terminal. Submitting a handoff request to the second wireless AP. Notifying the terminal to hand off to the second wireless AP in response to receiving a handoff response from the second wireless AP.

20 Claims, 4 Drawing Sheets

(56) References Cited

U.S. PATENT DOCUMENTS

| | | |
|---|---|---|
| 2007/0064660 A1* | 3/2007 | Qi .................... H04W 48/14 370/338 |
| 2007/0248059 A1* | 10/2007 | Jain ................ H04W 28/16 370/338 |
| 2009/0023426 A1* | 1/2009 | Shatzkamer ...... H04M 3/42246 455/414.1 |
| 2009/0141685 A1* | 6/2009 | Berglund .......... H04W 36/0055 370/331 |
| 2010/0317350 A1 | 12/2010 | Lee et al. |
| 2010/0322171 A1* | 12/2010 | Dekorsy ............. H04B 7/0621 370/329 |
| 2011/0294504 A1* | 12/2011 | Hara .................. H04W 48/16 455/434 |
| 2012/0008535 A1 | 1/2012 | Kuehnel |
| 2012/0099562 A1* | 4/2012 | Smadi ................ H04W 36/08 370/332 |
| 2013/0229976 A1 | 9/2013 | Srinivasan et al. |
| 2013/0272285 A1* | 10/2013 | Goldsmith ............ H04W 24/02 370/338 |
| 2014/0092742 A1* | 4/2014 | Chou .................. H04L 5/0055 370/235 |

OTHER PUBLICATIONS

"Method and apparatus of auto-connecting and combining several best wireless networks access point in mainframe", IP.com Disclosure No. IPCOM000229555D, Publication Date: Aug. 6, 2013, pp. 1-3, Copyright © 2009-2014 IP.com I, LLC, <http://priorart.ip.com/IPCOM/000229555D>.

\* cited by examiner

HANDING OFF A TERMINAL AMONG WIRELESS ACCESS POINTS

CROSS REFERENCE TO RELATED APPLICATION

Pursuant to 35 U.S.C. §119, the present application claims priority to Chinese Application No. 2013-10524940.6, filed Oct. 30, 2013, the entire contents of which are incorporated herein by reference.

TECHNICAL FIELD OF THE INVENTION

The invention relates to wireless communication, more particularly, to a terminal changing a connection between wireless access points.

BACKGROUND OF THE INVENTION

Currently, wireless communication has become more and more popular. Generally, a configuration for installing a wireless network includes wireless network cards and a wireless Access Point (AP). A wireless AP mainly functions as a bridge between wireless work stations and wired local area network (LAN) in a Media Access Control layer (MAC). With wireless AP, a wireless work station may connect to network quickly and easily.

With an increase in the use and complexity of wireless networks, there is often more than one available wireless AP in office area or other public location. Under current technology, generally, a wireless network card on a user device will access to a wireless AP based on preference order based on local settings of the work station, e.g., setting regarding whether the wireless AP can be authenticated and current channel quality etc. However, when a user is moving in the area, their changing location can lead to changes is channel quality and strength of a wireless AP that their workstation is connected to. At this time, the wireless network card will generally maintain connection with a current wireless AP to which it is connected, and will access another wireless AP only after communication is unavailable. In addition, quality of the connection is usually very poor before handoff (the process of changing from one wireless AP to another). During handoff, the connection between the work station and available wireless APs is severed for a short period of time. Thus, the device of the user, e.g., the work station, uses a large amount of power before the handoff due to increased energy requirements to transmit data. In addition, the speed of communication, before the handoff, is relatively low due to poor channel quality, thereby affecting performance of the whole network.

SUMMARY OF THE INVENTION

According to an embodiment of the present invention, there is provided a method for handing off a terminal among a plurality of wireless access points (APs), wherein the plurality of wireless APs is connected to a central management AP. The method comprising: receiving network condition information of a terminal communicatively connected to a first wireless AP in the plurality of wireless APs; determining a second wireless AP in the plurality of wireless APs to which the terminal is to be handed off based on the network condition information of the terminal, wherein the second wireless AP is virtually connected to the terminal; submitting a handoff request to the second wireless AP; and notifying the terminal to hand off from the first wireless AP to the second wireless AP in response to receiving a handoff response from the second wireless AP.

According to another embodiment of the invention, there is provided a system for handing off a terminal among a plurality of wireless access points (APs), wherein the plurality of wireless APs is connected to a central management AP. The system comprising: a receiving module configured to receive network condition information of a terminal communicatively connected to a first wireless AP in the plurality of wireless APs; a handoff determining module configured to determine a second wireless AP in the plurality of wireless APs to which the terminal is to be handed off based on the network condition information of the terminal, wherein the second wireless AP is virtually connected to the terminal; a handoff requesting module configured to submit a handoff request to the second wireless AP; and a handoff notifying module configured to notify the terminal to hand off from the first wireless AP to the second wireless AP in response to receiving a handoff response from the second wireless AP.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
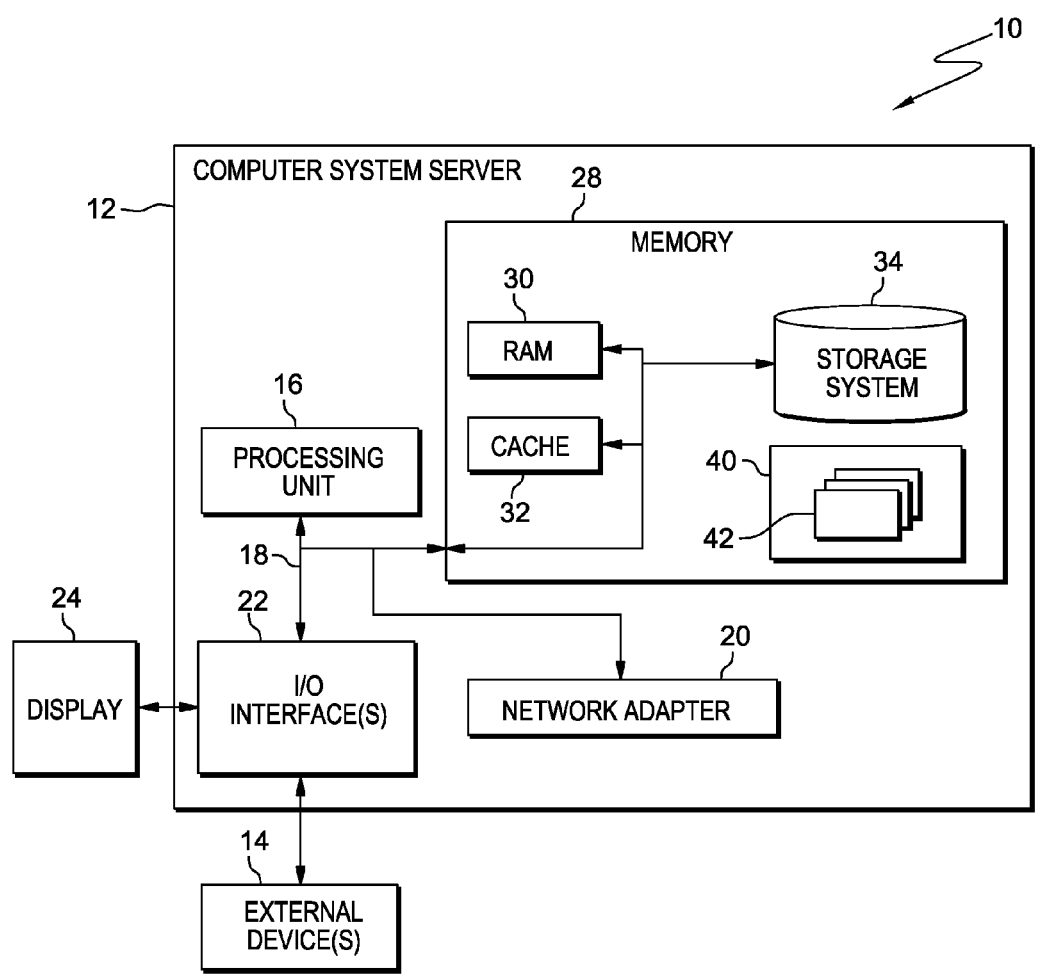
FIG. 1 illustrates a functional block diagram of an exemplary computer system/server, which is capable of implementing an embodiment of the present invention.

Embodiments of the present invention provide a solution capable of executing automatic handoff among wireless APs. One embodiment of the present invention provides a reduced usage of power before the handoff. One embodiment of the present invention provides increased speeds of communication before the handoff. One embodiment of the present invention provides increased performance of a communication through improved handoff among wireless APs. Embodiments of the present invention provide a mobile terminal that is connected to a wireless AP such that one or more of: i) channel quality is maximized; ii) network performance is improved; iii) throughput is increased; iv) power consumption is reduced; and v) disconnection during handoff is reduced. Note that as used channel quality refers to the quality of the communicative connection between a given AP and a terminal. In some embodiments, such a channel quality includes one or more of signal strength, rate of data transfer, and other parameters as are known and understood by those skilled in the art.

Certain embodiments are herein described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means or modules for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 illustrates a functional block diagram, 10, of an exemplary computer system/server 12, which is capable of implementing an embodiment of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In order to better solve the problem existed during access point (AP) handoff of a terminal, according to embodiments of the invention, there is proposed to use a centrally managed AP (parent AP) to centrally manage all other APs (child AP) within a same public area. The parent AP can be connected to child APs through wired or wireless links.

In one embodiment, the parent AP acquires channel quality information between a terminal and different child APs via manner of active scanning or terminal report, and by storing this information in a connection pool, the parent AP utilizes this information and in conjunction with other information (such as network congest degree etc.) to manage the handing off of terminals. A method and system according to various embodiments of the invention will be described below with reference to accompany drawings.

Figure 2:
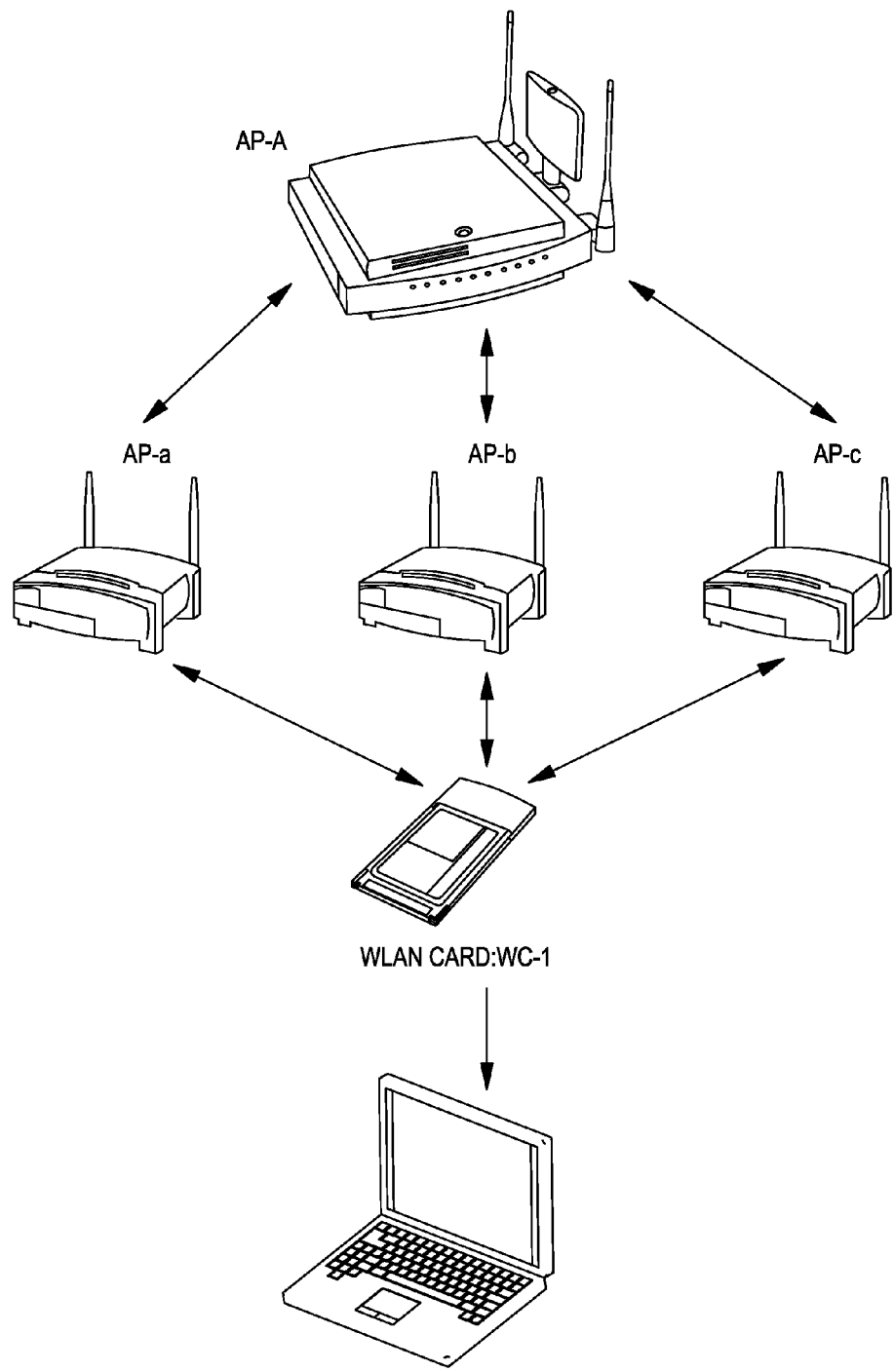
FIG. 2 depicts a diagram of a system for handing off connection between a terminal and access points (APs), according to an embodiment of the present invention.

FIG. 2 depicts a diagram of a system for handing off connection between a terminal and APs according to an embodiment of the invention.

As shown in FIG. 2, the system comprises a central management AP, i.e. parent AP (AP-A), and a plurality of child APs connected to the parent AP, such as AP-a, AP-b, AP-c, wherein, the parent AP can be connected to child APs by wired link such as existing wired network, or by wireless link such as wireless communication technology like a wireless mesh network (WMN).

The terminal is connected to and in communication with one of the plurality of child APs through a wireless network card wc-1, that is, they maintain a communicatively connected relationship. The terminal maintains a virtually connected relationship with other child APs. As used herein, a "virtual connection" refers to a physical network card of the terminal that virtualizes several virtual network cards. In addition, in one embodiment, virtual network cards probe other wireless APs to, for example, measure signal quality etc., but do not transfer data. In contrast, one virtual network card is actually connected to and in communication with the wireless AP, such a connection is herein denoted as a "real connection". Virtualization of a plurality of virtual network cards on a physical network card and keeping connected with different APs is a technique known in the art (the description of which is omitted herein for brevity). In this embodiment, through virtual connections with other child APs, the terminal probes channel quality of other child APs while maintaining communication with a current child AP.

In this embodiment, there is stored within the parent AP a connection pool holding connection information of each child AP, as shown in table 1. Table 1 shows an example of a connection pool stored in the parent AP for holding connection information between terminals and child APs. It should be noted that, channel quality in table 1 is represented by signal to interference plus noise ratio (SINR) and received signal strength indicator (RSSI). However, the representation may be made by any other manners for representing channel quality as are known to those skilled in the art.

TABLE 1

Connection pool of the parent AP (AP-A)

| Connection ID | Terminal name | Terminal MAC address | Child AP name | AP MAC address | Signal to interference plus noise ratio (SINR, dB) | Received signal strength indicator (RSSI, dBm) |
|---|---|---|---|---|---|---|
| Xxxx | test-23xx | 44-45-53-54-00-00 | AP-a | 34-35-50-14-10-21 | 20 | −60 |
| Xxxx | test-23xx | 44-45-53-54-00-00 | AP-b | 12-05-12-34-20-01 | 3 | −77 |

In each child AP, there is also stored information of each terminal connected thereto, and channel quality of each connection, as shown in table 2.

TABLE 2

Information of terminals stored in a child AP (AP-a)

| Terminal No. | Terminal name | Terminal MAC address | Signal to interference plus noise ratio (SINR, dB) | Received signal strength indicator (RSSI, dBm) |
|---|---|---|---|---|
| MS-1 | test-23xx | 44-45-53-54-00-00 | 20 | −60 |

In this embodiment, each terminal also stores the information of each child AP to which it may be connected and the associated channel quality, as shown in table 3.

TABLE 3

Information of child APs stored in a terminal

| AP No. | AP name | AP MAC address | Signal to interference plus noise ratio (SINR, dB) | Received signal strength indicator (RSSI, dBm) | Real connection or not |
|---|---|---|---|---|---|
| 1 | AP-a | 34-35-50-14-10-21 | 20 | −60 | Yes |
| 2 | AP-b | 12-05-12-34-20-01 | 3 | −77 | No |

Note that in one embodiment, the above information is acquired during actual operation of the system.

The procedure of establishing communication connection and virtual connection between a terminal and each AP is further described below. In this embodiment, after the terminal is powered on, the terminal searches for nearby AP (within communication range), identifies a nearby AP, and is connected to that AP (AP-a) after authentication. Accordingly, connection information is stored in the terminal, as shown in first row of the above Table 3. In this embodiment, in AP-a, there is also stored connection information between it and the terminal, as shown in the above Table 2. At the same time, AP-A acquires and stores connection information regarding the connection between AP-a and the terminal. This connection information is stored in the connection pool through connections between the central management AP (e.g., AP-A), and each child AP (as shown in first row of the above Table 1). In various embodiments, the virtual connection between the terminal and other child APs is created using various processes. For example, the terminal continues to search other nearby APs and finds AP-b, and establish a virtual connection therewith. Alternatively, the central management AP acquires data identifying the connection between the terminal and AP-a via AP-a. For example, the central management AP finds other child APs around AP-a by querying AP-a's stored topology structure, and notifies the terminal (via AP-a). Accordingly, the terminal finds AP-b and establishes a virtual connection therewith. In another alternative, the central management AP notifies other child APs around AP-a by querying the nearby APs topology structure and utilizes AP-a to store that topology structure information. When the terminal establishes a connection with AP-A, AP-a notifies the terminal. Accordingly, the terminal finds AP-b, and establishes a virtual connection therewith. In this embodiment, after the terminal establishes a virtual connection with AP-b, the connection information is stored in the terminal, as shown in second row of the above Table 3. In a similar way, the information is also stored in connection pool of the central management AP, as shown in second row of the above Table 1.

It should be noted that, in certain embodiments, information in Tables 1, 2 and 3 are not invariable, during operation. As such, in some embodiments, the terminal periodically or non-periodically updates information in Tables 1, 2 and 3 either actively or according to signals received from one or both of AP-A and AP-a.

Figure 3:
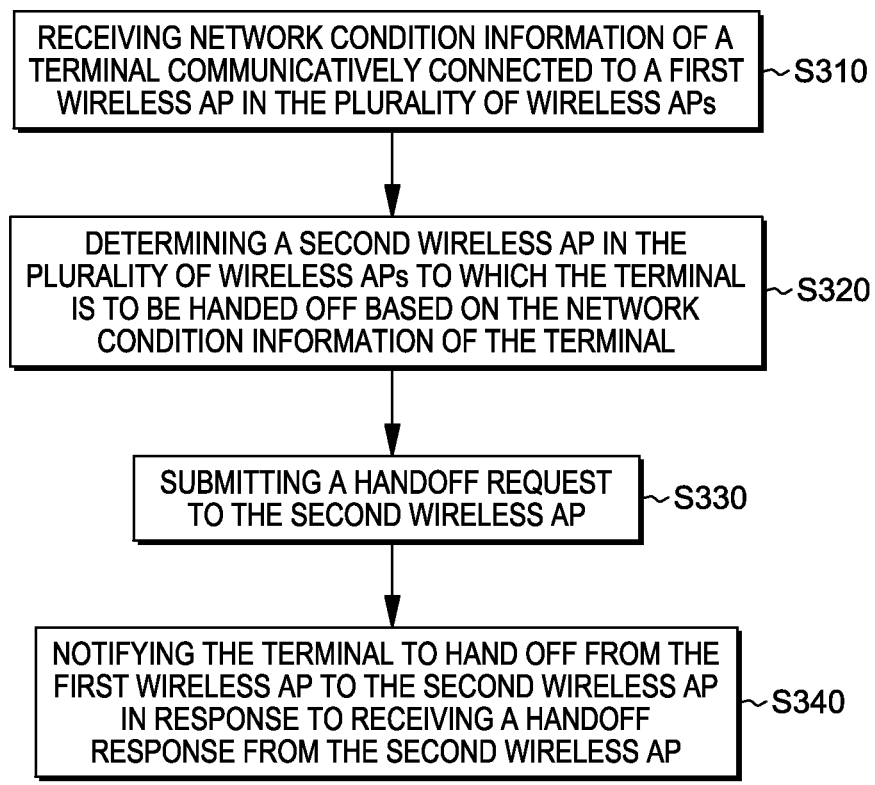
FIG. 3 depicts a flowchart of a method for handing off a terminal among a plurality of wireless APs, according to an embodiment of the present invention.

A flowchart of a method for handing off a terminal among a plurality of wireless APs, according to an embodiment of the invention, is described below with reference to FIG. 3. Wherein, a plurality of wireless APs is connected to a central management AP through one or both of wired or wireless connections.

In step S310, the central management AP receives network condition information of a terminal communicatively connected to a first wireless AP in the plurality of wireless APs. According to one embodiment, in case that the terminal is communicatively connected to a wireless AP, the parent AP acquires network condition information about the terminal through a wireless AP communicatively connected to (i.e. being in real connection with) the terminal.

In one embodiment, network condition information of the terminal received by the central management AP includes one or both of i) network condition information of the terminal stored in the first wireless AP, and ii) network condition information of the terminal stored in the terminal and forwarded to the first wireless AP by the terminal.

In one embodiment, network condition information of the terminal includes, for example, information such as AP name of a AP to which the terminal is connected, AP media access control layer (MAC) address, quality of a channel connected to AP, and whether connection with the AP is a real connection or not.

In this embodiment, in step S320, the parent AP determines a second wireless AP in the plurality of wireless APs to which the terminal is to be handed off based on the network condition information of the terminal, wherein the second wireless AP is virtually connected to the terminal.

As mentioned above, a virtual connection refers to a connection through which there is no data transmission between the terminal and a wireless AP. In one scenario, the parent AP includes data that indicates the channel quality of the first wireless AP (currently communicatively connected to the terminal) and channel quality of other wireless APs (virtually connected to the terminal via the received network condition information of the terminal). In this embodiment, based, at least in part, on such connection information, it is determined whether there is a need to hand off the connection to other wireless APs and, if so, to which wireless AP the terminal should be handed off to.

For example, in case that the terminal is communicatively connected to AP-a and is virtually connected to AP-b and AP-c, it is determined whether handoff is needed by comparing channel quality of the first wireless AP (i.e. AP-a) with a certain threshold. If AP-a's channel quality is lower than that specified by the certain threshold, then it is determined that there is a need to perform the handoff. As such, an AP having better channel quality that of AP-a is selected for handing off by comparing the channel quality of AP-b and that of AP-c to that of AP-a. In some embodiments, the difference in channel quality must exceed a threshold before such a handing off occurs. For example, by comparing channel quality of AP-a and that of other wireless APs that are virtual connected to the terminal (such as AP-b or AP-c), and determining whether the difference between them exceeds a certain threshold, it is determined whether handoff is needed. In practice, those skilled in the art may select various suitable manners to determine a wireless AP to which the terminal is to be handed off to according to actual need of a system.

In this embodiment, in step S330, the parent AP submits a handoff request to the second wireless AP. In one embodiment, information about the terminal such as identification (ID), MAC address of the terminal etc., is included in the handoff request.

In this embodiment, in step S340, the parent AP notifies the terminal of handing off from the first wireless AP to the second wireless AP in response to receiving a handoff response from the second wireless AP.

According to an embodiment of the invention, the parent AP provides channel information of the second wireless AP to the terminal via the first wireless AP currently in virtual connection with the terminal. In this embodiment, the terminal replaces channel information of the first wireless AP with channel information of the second wireless AP to hand off to the second wireless AP. In this embodiment, the channel information includes the MAC address of the wireless AP. In addition, in some embodiments, the channel information further includes operating frequency, channel quality etc.

According to an embodiment of the invention, the parent AP updates and maintains communication condition information in response to the terminal handing off to the second wireless AP. In this embodiment, after the terminal hands-off to the second wireless AP, the second wireless AP notifies the parent AP, which includes information indicating that the handoff is completed. In response, the parent AP updates information in the maintained connection pool of the parent AP after receiving the notification from the second wireless AP. In this embodiment, the parent AP also issues a notification to the first wireless AP, which indicates to the first wireless AP connection between the first wireless AP and the terminal has been handed off to the second wireless AP. In this embodiment, in response to receiving such an indication, the first wireless AP clears its stored information about the terminal.

In this embodiment, with the above method, delay and even network disconnection due to handoff in wireless network is reduced. In addition, there is a reduction of poor user experience due to slow network speed (in case of poor channel quality) Further, the problem of high transmission power needed while the terminal is in communication with an AP due to poor signal quality is reduced. In some cases, interference due to ambient wireless networking signals is also reduced.

Figure 4:
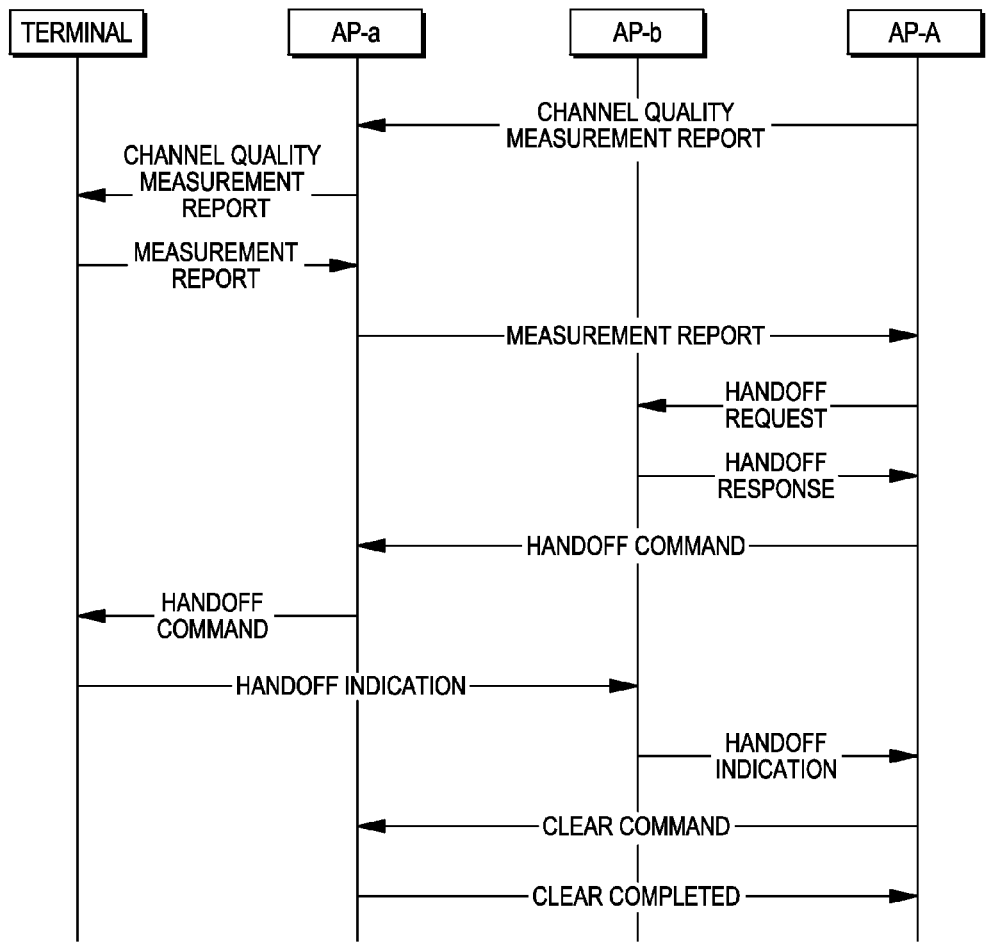
FIG. 4 depicts a diagram of an example of a flow of handing off a terminal among a plurality of wireless APs, according to an embodiment of the present invention.

FIG. 4 depicts a diagram of an example of a flow for handing off a terminal among a plurality of wireless APs according to an embodiment of the invention.

As shown in FIG. 4, AP-A is a parent AP, the terminal is a computer, AP-a is a network access point currently having poor signal, AP-b is a network access point having better signal. In the case where the parent AP determines that AP-a has poor signal (eg., the signal quality falls below a minimum threshold), the parent AP finds and assigns a better connection (e.g., AP-b) to the computer. FIG. 4 illustrates a procedure for handing off the computer from AP-a to AP-b.

In this embodiment, tables stored in various child APs before handoff are shown as Tables 4-1 and 4-2 below. In this embodiment, the parent AP frequently checks network condition of the terminal. As shown in FIG. 4, AP-A sends a channel quality measurement request to AP-a. In response, AP-a forwards this request to a terminal communicatively connected therewith. The terminal returns a channel quality measurement report to AP-a in response to receiving the request, and AP-a accordingly forwards the report to AP-A. In this embodiment, AP-A immediately updates its stored connection pool to include the status of the child APs. In this embodiment, when signal of a network actually communicatively connected to the terminal is far poorer than (such as, lower than a threshold) that of other connectable network such as AP-b, it is determined that a network handoff needs to be performed. At this point, AP-A sends a handoff request to AP-b, and information such as MAC address of the terminal etc., is contained in the handoff request. If AP-b is capable of accepting the terminal, AP-b sends a response of approving the handoff request to the parent AP. After receiving the response, the parent AP sends a handoff command to AP-a, to tell AP-a to make the terminal hand off to AP-b, and confers other information, such as MAC address of AP-b etc., to the terminal via AP-a.

In this embodiment, after the terminal receives the handoff command of AP-a and MAC address of AP-b, the terminal hands the communication connection off to AP-b by replacing MAC address of AP-a with MAC address of AP-b. In this embodiment, the terminal also adds a connection record in stored table of AP-b. Once AP-b has completed handoff, AP-b reports to the parent AP (in this case AP-A). Finally, the parent AP sends an instruction to AP-a, notifying AP-a that the terminal has been connected to AP-b. In response, AP-a confirms that information associated with the terminal has been cleared form AP-a, and the whole handoff procedure is completed after the clearance is completed. At this point, the resulting tables stored in child APs are shown below as Tables 5-1 and 5-2.

TABLE 4-1

Information of terminal stored in AP-a

| Terminal No. | Terminal name | Terminal MAC address | Channel quality (dB) | Received signal strength (dBm) |
|---|---|---|---|---|
| MS-1 | test-23xx | 44-45-53-54-00-00 | 3 | −77 |

TABLE 4-2

Information of terminal stored in AP-b

| Terminal No. | Terminal name | Terminal MAC address | Connection speed |
|---|---|---|---|

TABLE 5-1

Information of terminal stored in AP-a

| Terminal No. | Terminal name | Terminal MAC address | Connection speed |
|---|---|---|---|

TABLE 5-2

Information of terminal stored in AP-b

| Terminal No. | Terminal name | Terminal MAC address | Channel quality (dB) | Received signal strength (dBm) |
|---|---|---|---|---|
| MS-1 | test-23xx | 44-45-53-54-00-00 | 20 | −60 |

In the diagram shown in FIG. 4, it is the parent AP that actively acquires network connection condition of a terminal. In this embodiment, the parent AP actively initiates handoff procedure in case that network condition is poor. However, it will be appreciated by those skilled in the art that, the terminal or a child AP in middle layer (such as AP-a/b/c) may also initiate handoff of network connection based on information about channel quality.

For example, according to an embodiment of the invention, a terminal actively initiates the handoff procedure. In one embodiment, while in communication with an AP, the terminal also periodically probes channel quality of other APs. Alternatively, in one embodiment, in order to save energy, channel quality probation on other APs is triggered when it is determined that channel quality of the current AP has degraded. In such a case and in one embodiment, while keeping communication connection with AP-a, the terminal scans connection condition of other APs virtually connected thereto. When it is determined that there is an AP-b that has better channel quality, a handoff request is actively made to parent AP (AP-A) via AP-a. In one embodiment, in case that AP-A receives the handoff request, it is confirmed by AP-b whether such a handoff can be performed (based, at least in part, on system limitations). The subsequent flow and processing is substantially similar to that described above and is omitted here for brevity.

In some embodiments, scanning of channel quality by a terminal is performed using a different process. According to one embodiment of the invention, when a terminal is scanning channel quality, the terminal scans all the possible operating frequency bands to identify all the APs around that terminal. However, in some embodiments, such a scan is time-consuming, consumes high energy, and occupies a relatively long network communication time.

According to one embodiment, a parent AP determines the approximate position of a terminal using a combination of techniques, such as wireless positioning etc, and actively notifies the terminal of information of APs that are adjacent to the parent AP. The parent AP then approximates the distance to those APs and the network topology of child APs managed by the parent AP. In some cases, a terminal is instructed to perform a directional scan, which reduces number of APs being scanned and number of times a terminal scans APs. In certain scenarios, this approach results in at least one of: i) a reduction in power consumption by the terminal, and ii) an improvement in the effective communication time of the terminal with current AP.

At least one embodiment of the present invention manages a plurality of APs, located within a same public area, by setting up a central management AP. Such an embodiment has access to information indicating the status of those managed APs, and acquires channel quality information of each mobile terminal. In addition, in some embodiments, a mobile terminal also scans for available APs to which connection can be made. In some embodiments, even if the mobile terminal has been connected to a network, that mobile terminal can still receive signals from other APs and establish virtual connection therewith. In some embodiments, when the mobile terminal needs to change to a different network, it only needs to alter MAC address of an AP in a MAC packet, thereby completing a soft handoff which, in some cases, is apparent to the user of the mobile terminal. In this way, certain embodiments enable the mobile terminal to receive signal having the best available quality.

Figure 5:
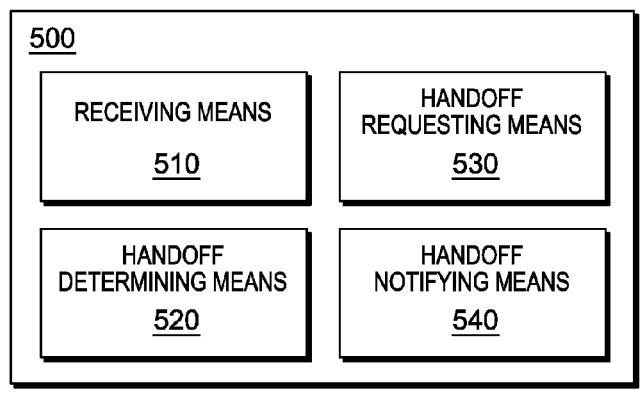
FIG. 5 depicts a block diagram of a system for handing off a terminal among a plurality of wireless APs, according to an embodiment of the present invention.

FIG. 5 depicts a block diagram of a system for handing off a terminal among a plurality of wireless APs according to an embodiment of the invention.

As shown in FIG. 5, the system 500 comprises a number of modules, which in FIG. 5 are denoted as "means". Such modules include one or both of the hardware and software (e.g., programming and logic) to perform one or more processes included in the method described in the previous sections. In this embodiment, such modules include: a receiving means 510, a handoff determining means 520, a handoff requesting means 530 and a handoff notifying means 540. The receiving means 510 is configured to receive network condition information of a terminal communicatively connected to a first wireless AP in the plurality of wireless APs. The handoff determining means 520 is configured to determine a second wireless AP in the plurality of wireless APs to which the terminal is to be handed off based on the network condition information of the terminal. The second wireless AP is virtually connected to the terminal. The handoff requesting means 530 is configured to submit a handoff request to the second wireless AP. The handoff notifying means 540 is configured to notify the terminal to hand off from the first wireless AP to the second wireless AP in response to receiving a handoff response from the second wireless AP.

According to an embodiment of the invention, the handoff notifying means 540 further comprises: one or more modules (not shown) that are configured to provide channel information of the second wireless AP to the terminal via the first wireless AP. The terminal replaces channel information of the first wireless AP with channel information of the second wireless AP to hand off to the second wireless AP. The channel information is MAC address of a wireless AP.

According to an embodiment of the invention, the receiving means 510 receives network condition information of terminals stored in the first wireless AP.

According to an embodiment of the invention, the receiving means 510 receives network condition information of terminals stored in the terminal and forwarded to the first wireless AP by the terminal.

According to an embodiment of the invention, the system 500 further comprises modules (not shown) configured to update maintained network condition information in response to the terminal handing off to the second wireless AP.

According to an embodiment of the invention, the system 500 further comprises modules (not shown) configured to notify the first wireless AP to clear information about the terminal therein in response to the terminal handing off to the second wireless AP. The network condition of the terminal includes channel quality information.

According to an embodiment of the invention, the handoff determining means 540 comprises: one or more modules configured to determine that the second wireless AP is a wireless AP to which the terminal is to be handed off to in response to a difference between channel quality information of the second wireless AP and channel quality information of the first wireless AP exceeding a certain threshold.

According to an embodiment of the invention, the handoff determining means 540 comprises: one or more modules configured to determine a second wireless AP in the plurality of wireless APs to which the terminal is to be handed off based on the network condition information of the terminal and network topology of the plurality of wireless APs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for handing off a terminal among a plurality of wireless access points (APs), wherein the plurality of wireless APs is connected to a central management AP, the method comprising:
   receiving, by one or more processors, a network condition information of a terminal communicatively connected to a first wireless AP in the plurality of wireless APs;
   identifying, by the one or more processors, a second wireless AP, the second wireless AP being virtually connected to the terminal, wherein identifying the second wireless AP is performed based on the results of a wireless scan performed by at least one of the terminal or the central management AP, wherein the wireless scan is directionally defined by the topology of network APs and a determined positioning of the terminal;
   determining, by the one or more processors, the network condition between the first wireless AP and the terminal, wherein the network condition between the first wireless AP and the terminal describes at least one piece of information associated with the connection between the first wireless AP and the terminal;
   determining, by the one or more processors, the network condition between the second wireless AP and the terminal, wherein the network condition between the second wireless AP and the terminal describes at least one piece of information associated with the connection between the second wireless AP and the terminal;
   determining, by the one or more processors, that network condition between the first wireless AP and the terminal has fallen below a connection degradation threshold;
   in response to determining that the network condition between the first wireless AP and the terminal has fallen below a connection degradation threshold, determining, by the one or more processors, that the difference between network condition between the second wireless AP and the terminal and network condition between the first wireless AP and the terminal exceeds a connection improvement threshold; and
   in response to determining that the difference between network condition between the second wireless AP and the terminal and network condition between the first wireless AP and the terminal exceeds a connection improvement threshold,
   submitting, by the one or more processors, a handoff request to the second wireless AP; and
   notifying, by the one or more processors, the terminal to handoff from the first wireless AP to the second wireless AP in response to receiving a handoff response from the second wireless AP.

2. The method according to claim 1, the method further comprising:
   providing, by one or more processors, channel information of the second wireless AP to the terminal via the first wireless AP, wherein the terminal replaces the channel information of the first wireless AP with channel information of the second wireless AP to hand off to the second wireless AP.

3. The method according to claim 2, wherein the channel information is MAC address of a wireless AP.

4. The method according to claim 1, the method further comprising:
   receiving, by one or more processors, information associated with connections of the terminal that is stored in the first wireless AP.

5. The method according to claim 1, the method further comprising:
   receiving, by one or more processors, information associated with connections of the terminal that is stored in the terminal and forwarded to the first wireless AP by the terminal.

6. The method according to claim 1, the method further comprising:
   determining, by one or more processors, a second wireless AP in the plurality of wireless APs to which the terminal is to be handed off to based, at least in part, on, information associated with connections of the terminal and network topology of the plurality of wireless APs.

7. The method according to claim 1, wherein the information associated with connections of the terminal comprises channel quality information.

8. The method according to claim 7, the method further comprising:
   determining, by one or more processors, that the second wireless AP is a wireless AP to which the terminal is to be handed off to in response to a difference between channel quality information of the second wireless AP and channel quality information of the first wireless AP exceeding a threshold.

9. The method according to claim 1, the method further comprising:
   updating, by one or more processors, maintained information associated with connections of the terminal in response to the terminal handing off to the second wireless AP.

10. The method according to claim 1, the method further comprising:
   notifying, by one or more processors, the first wireless AP to clear information associated with connections of the terminal therein in response to the terminal handing off to the second wireless AP.

11. A system for handing off a terminal among a plurality of wireless access points (APs), wherein the plurality of wireless APs is connected to a central management AP, the system comprising:
one or more computer processors;
one or more computer readable storage medium;
program instructions stored on the computer readable storage medium for execution by at least one of the one or more processors, wherein the program instructions comprise instructions to:
receive network condition information of a terminal communicatively connected to a first wireless AP in the plurality of wireless APs;
identify a second wireless AP, the second wireless AP being virtually connected to the terminal, wherein identifying the second wireless AP is performed based on the results of a wireless scan performed by at least one of the terminal or the central management AP, wherein the wireless scan is directionally defined by the topology of network APs and a determined positioning of the terminal;
determine the network condition between the first wireless AP and the terminal, wherein the network condition between the first wireless AP and the terminal describes at least one piece of information associated with the connection between the first wireless AP and the terminal;
determine the network condition between the second wireless AP and the terminal, wherein the network condition between the second wireless AP and the terminal describes at least one piece of information associated with the connection between the second wireless AP and the terminal;
determine a second wireless AP in the plurality of wireless APs to which the terminal is to be handed off based on the network condition information of the terminal, wherein the second wireless AP is virtually connected to the terminal;
determine that network condition between the first wireless AP and the terminal has fallen below a connection degradation threshold;
in response to determining that the network condition between the first wireless AP and the terminal has fallen below a connection degradation threshold, determine that the difference between network condition between the second wireless AP and the terminal and network condition of between the first wireless AP and the terminal exceeds a connection improvement threshold; and
in response to determining that the difference between network condition between the second wireless AP and the terminal and network condition between the first wireless AP and the terminal exceeds a connection improvement threshold, submit a handoff request to the second wireless AP; and
notify the terminal to hand off from the first wireless AP to the second wireless AP in response to receiving a handoff response from the second wireless AP.

12. The system according to claim 11, wherein the program instructions further comprise instructions to:
provide channel information of the second wireless AP to the terminal via the first wireless AP, wherein the terminal replaces channel information of the first wireless AP with channel information of the second wireless AP to hand off to the second wireless AP.

13. The system according to claim 12, wherein the channel information is MAC address of a wireless AP.

14. The system according to claim 11, wherein the program instructions further comprise instructions to receive network condition information of terminals information associated with connections of the terminal stored in the first wireless AP.

15. The system according to claim 11, wherein the program instructions further comprise instructions to receive network condition information of terminals information associated with connections of the terminal and forwarded to the first wireless AP by the terminal.

16. The system according to claim 11, wherein the program instructions further comprise instructions to
determine a second wireless AP in the plurality of wireless APs to which the terminal is to be handed off based on the network condition information of terminals information associated with connections of the terminal and network topology of the plurality of wireless APs.

17. The system according to claim 11, wherein the network condition information of terminals information associated with connections of the terminal comprises channel quality information.

18. The system according to claim 17, wherein the program instructions further comprise instructions to:
determine that the second wireless AP is a wireless AP to which the terminal is to be handed off in response to a difference between channel quality information of the second wireless AP and channel quality information of the first wireless AP exceeding a certain threshold.

19. The system according to claim 11, wherein the program instructions further comprise instructions to:
update maintained network condition information information associated with connections of the terminal in response to the terminal handing off to the second wireless AP.

20. The system according to claim 11, wherein the program instructions further comprise instructions to:
notify the first wireless AP to clear information about the terminal therein in response to the terminal handing off to the second wireless AP.

* * * * *